(12) United States Patent
Cheng et al.

(10) Patent No.: US 8,143,622 B2
(45) Date of Patent: Mar. 27, 2012

(54) DISPLAY PANEL

(75) Inventors: Tsung-Chin Cheng, Kaohsiung (TW); Zeng-De Chen, Yunlin County (TW); Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 92 days.

(21) Appl. No.: 12/858,443

(22) Filed: Aug. 18, 2010

(65) Prior Publication Data

US 2011/0291094 A1    Dec. 1, 2011

(30) Foreign Application Priority Data

May 31, 2010  (TW) ................................ 99117434 A
Jul. 30, 2010  (TW) ................................ 99125386 A

(51) Int. Cl.
*H01L 33/08*    (2010.01)
(52) U.S. Cl. .................... 257/59; 257/72; 257/E33.003; 257/E33.004

(58) Field of Classification Search ................ 257/59, 257/72, E33.003, E33.004
See application file for complete search history.

(56) References Cited

U.S. PATENT DOCUMENTS

| | | | |
|---|---|---|---|
| 6,646,707 B2 * | 11/2003 | Noh et al. ..................... 349/141 |
| 7,215,404 B2 | 5/2007 | Chun et al. | |
| 2009/0135342 A1 * | 5/2009 | Lee ................................. 349/96 |
| 2010/0304015 A1 * | 12/2010 | Kim et al. ...................... 427/67 |

* cited by examiner

*Primary Examiner* — Long Pham
(74) *Attorney, Agent, or Firm* — Jianq Chyun IP Office

(57) ABSTRACT

A display panel including a first substrate, a second substrate opposite to the first substrate and a display medium between the first substrate and the second substrate is provided. The first substrate has a scan line, a data line and an active device electrically connected to the scan line and the data line. The second substrate has a common electrode layer, an insulting layer covering the common electrode layer, a pixel electrode on the insulating layer and a contact structure on the insulating layer. More specifically, the contact structure is electrically connected to the pixel structure and electrically connected to the active device on the first substrate.

22 Claims, 16 Drawing Sheets

DISPLAY PANEL

CROSS-REFERENCE TO RELATED APPLICATION

This application claims the priority benefit of Taiwan application serial no. 99117434, filed on May 31, 2010 and Taiwan application serial no. 99125386, filed on Jul. 30, 2010. The entirety of each of the above-mentioned patent applications is hereby incorporated by reference herein and made a part of this specification.

BACKGROUND OF THE PRESENT INVENTION

1. Field of the Present Invention

The invention is related to a display panel, and in particular to a liquid crystal display panel.

2. Description of Related Art

Recently, thin film transistor liquid crystal displays (TFT-LCDs) equipped with superior properties such as high contrast ratio, no gray scale inversion, high luminance, high color saturation, high response speed and wide viewing angle have become mainstream display products in the market. At the current stage, LCD panel technologies that have been developed to satisfy the requirement of a wide viewing angle include: twisted nematic (TN) LCD panels equipped with wide viewing films, in-plane switching (IPS) LCD panels, fringe field switching (FFS) LCD panels and multi-domain vertically alignment (MVA) LCD panels.

IPS LCD panels and FFS LCD panels are usually formed by an active device array substrate, a color filter substrate opposite to the active device array substrate and a liquid crystal layer between the active device array substrate and the color filter substrate. The active device array substrate is constituted by an active device array on an inner surface of a first substrate, and the active device array includes pixel electrodes and common electrodes. The color filter substrate is constituted by a color filter array on an inner surface of a second substrate. When a finger touches the display panel, the electric field in the display panel may be changed, such that the display quality is affected. Thereby, an additional transparent conductive layer is required to form on an outer surface of the color filter substrate. That means a transparent conductive layer is additionally formed on the outer surface of the second substrate, wherein the outer surface is different from the inner surface of the second substrate where the color filter array is disposed, so as to avoid the electric field in the display panel being changed when a finger touches the display panel. However, the transmittance of the display panel is reduced because of the formation of the transparent conductive layer.

SUMMARY OF THE PRESENT INVENTION

The present invention is directly to a display panel in which a transparent conductive layer is not needed to form on the outer surface of the color filter substrate, so as to avoid the transmittance of the display panel being reduced.

A display panel including a first substrate, a second substrate opposite to the first substrate and a display medium between the first substrate and the second substrate is provided. The first substrate has a scan line, a data line and an active device electrically connected to the scan line and the data line. The second substrate has a common electrode layer, an insulting layer covering the common electrode layer, a pixel electrode on the insulating layer and a contact structure on the insulating layer. More specifically, the contact structure is electrically connected to the pixel structure and electrically connected to the active device on the first substrate.

A display panel including a first substrate, a second substrate opposite to the first substrate and a display medium between the first substrate and the second substrate is provided. The first substrate has a scan line, a data line and an active device electrically connected to the scan line and the data line. The second substrate comprises a pixel electrode, a contact structure electrically to the pixel electrode and the active device on the first substrate, and a common electrode alternatively arranged with the pixel electrode.

According to the aforementioned, the pixel electrode and the common electrode layer (the common electrode) are disposed on the second substrate. When a finger touches the display panel (the second substrate), the electric field in the display panel is not changed. Therefore, a transparent conductive layer is not needed to form on the outer surface of the second substrate, so as to avoid the transmittance of the display panel being reduced.

It is to be understood that both the foregoing general descriptions and the following detailed embodiments are exemplary and are, together with the accompanying drawings, intended to provide further explanation of technical features and advantages of the present invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
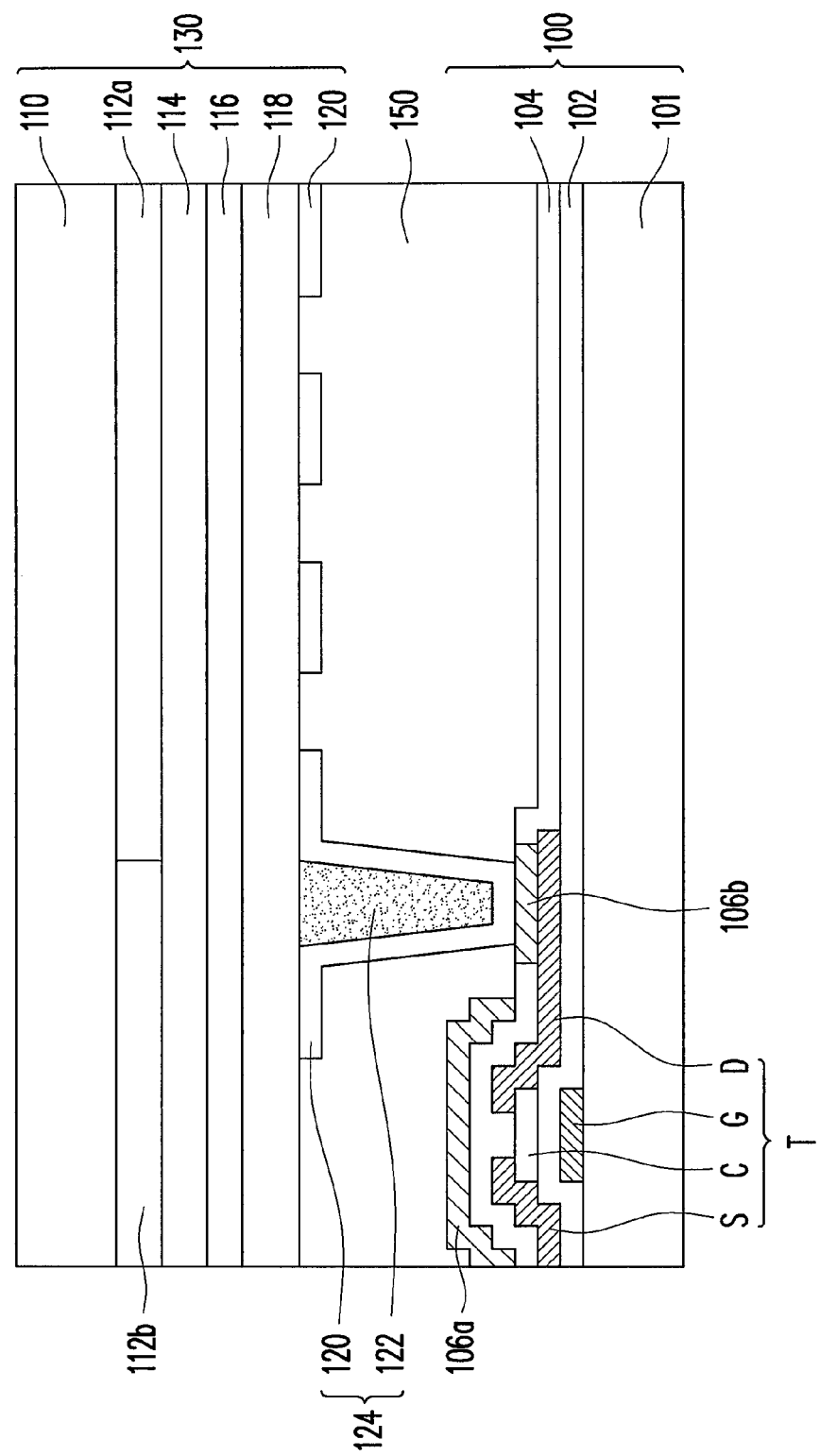
FIG. 1 is a schematic cross-sectional view of a display panel according to an embodiment of the present invention.
Figure 2A:
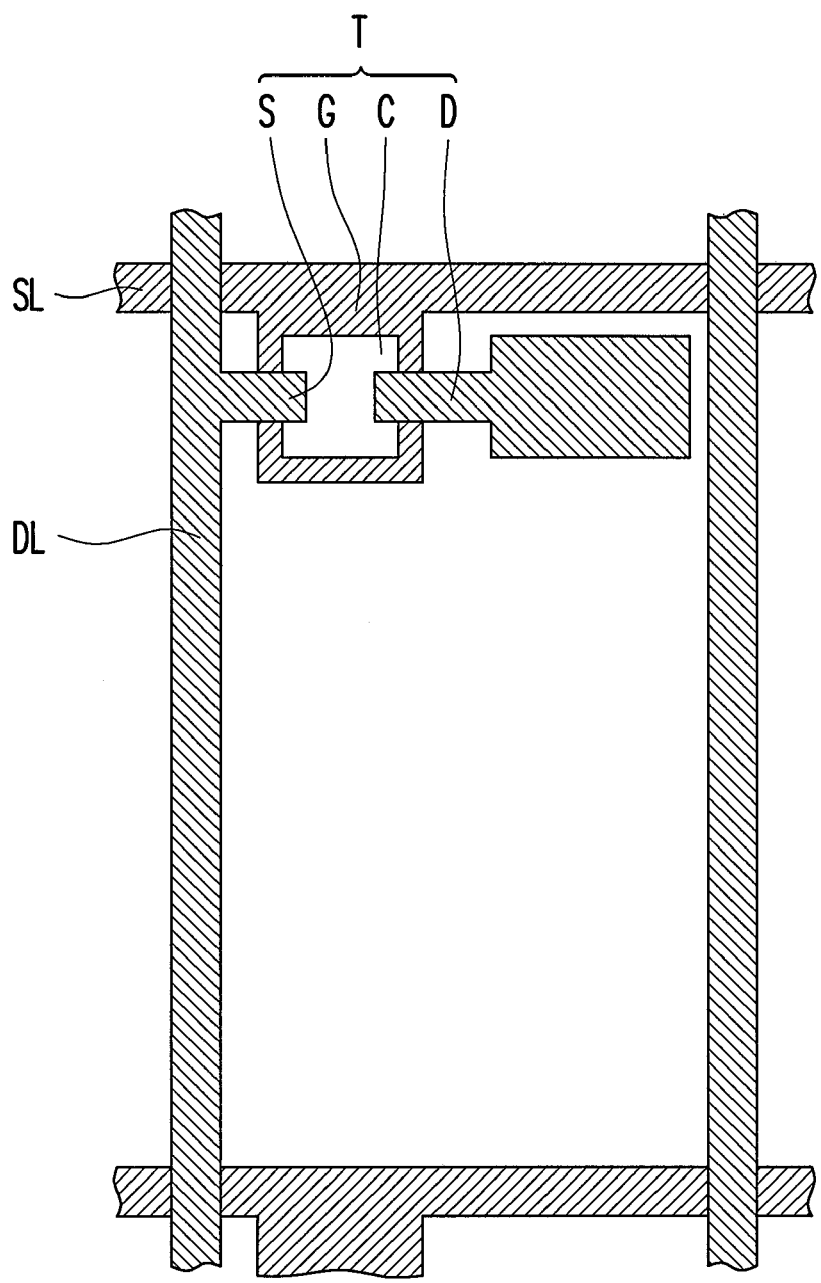
FIG. 2A is a top view of the first substrate of the display panel in FIG. 1.
Figure 2B:
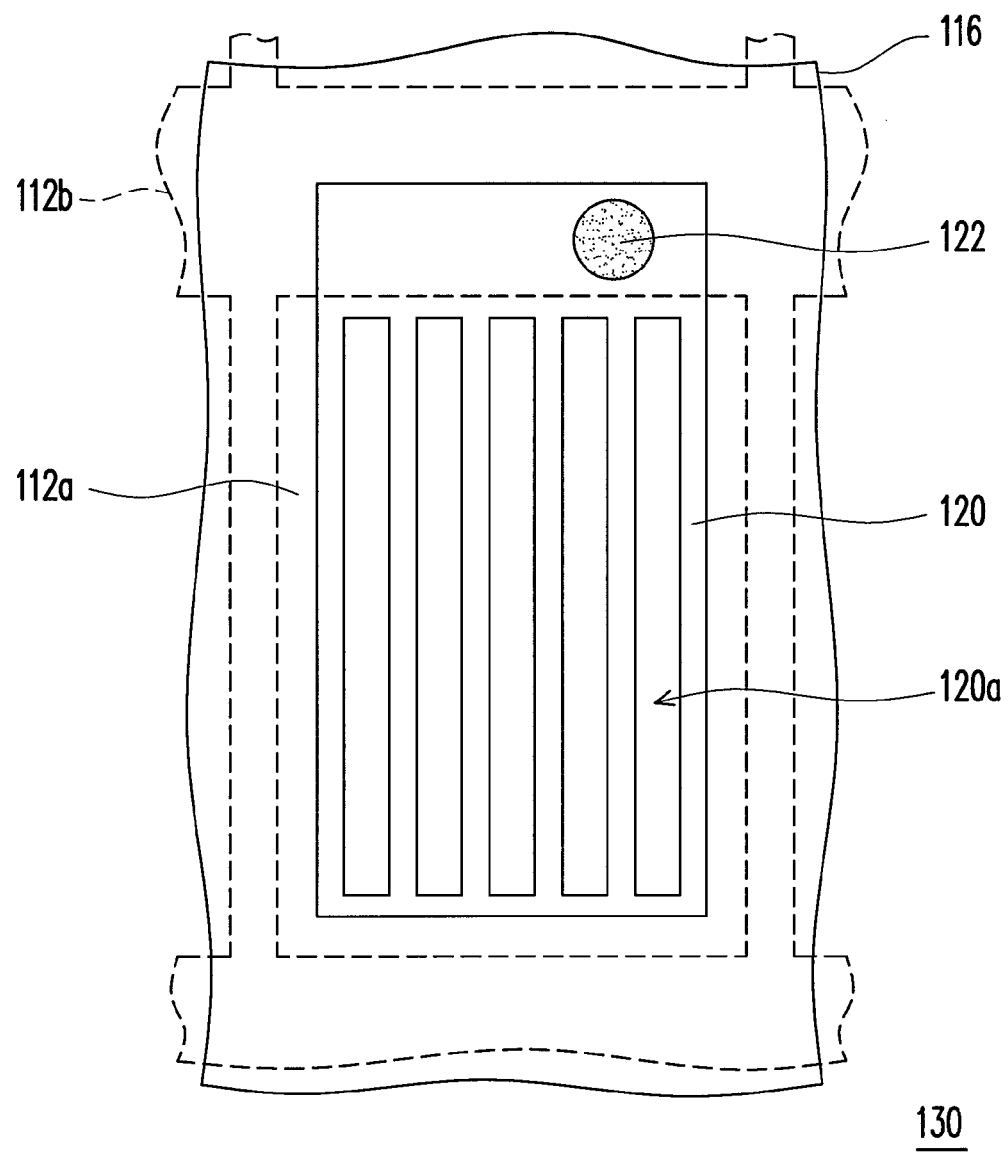
FIG. 2B is a top view of the second substrate of the display panel in FIG. 1.

FIG. 1 is a schematic cross-sectional view of a display panel according to an embodiment of the present invention. FIG. 2A is a top view of the first substrate of the display panel in FIG. 1. FIG. 2B is a top view of the second substrate of the display panel in FIG. 1. Referring to FIG. 1, FIG. 2A and FIG. 2B, the display panel of the embodiment comprises a first substrate 100, a second substrate 130, and a display medium 130 between the first substrate 100 and the second substrate 130. The display medium 130 comprises liquid crystal molecules, an electrophoretic display medium or other suitable display mediums. In the embodiment, the display medium 130 comprises liquid crystal molecules for illustration, but it does not limit the present invention. In addition, the liquid crystal molecules in the embodiment are liquid crystal molecules which may be twisted or switched by a horizontal electric field or a lateral electric field for or illustration, but the present invention is not limited herein.

Figure 10A:
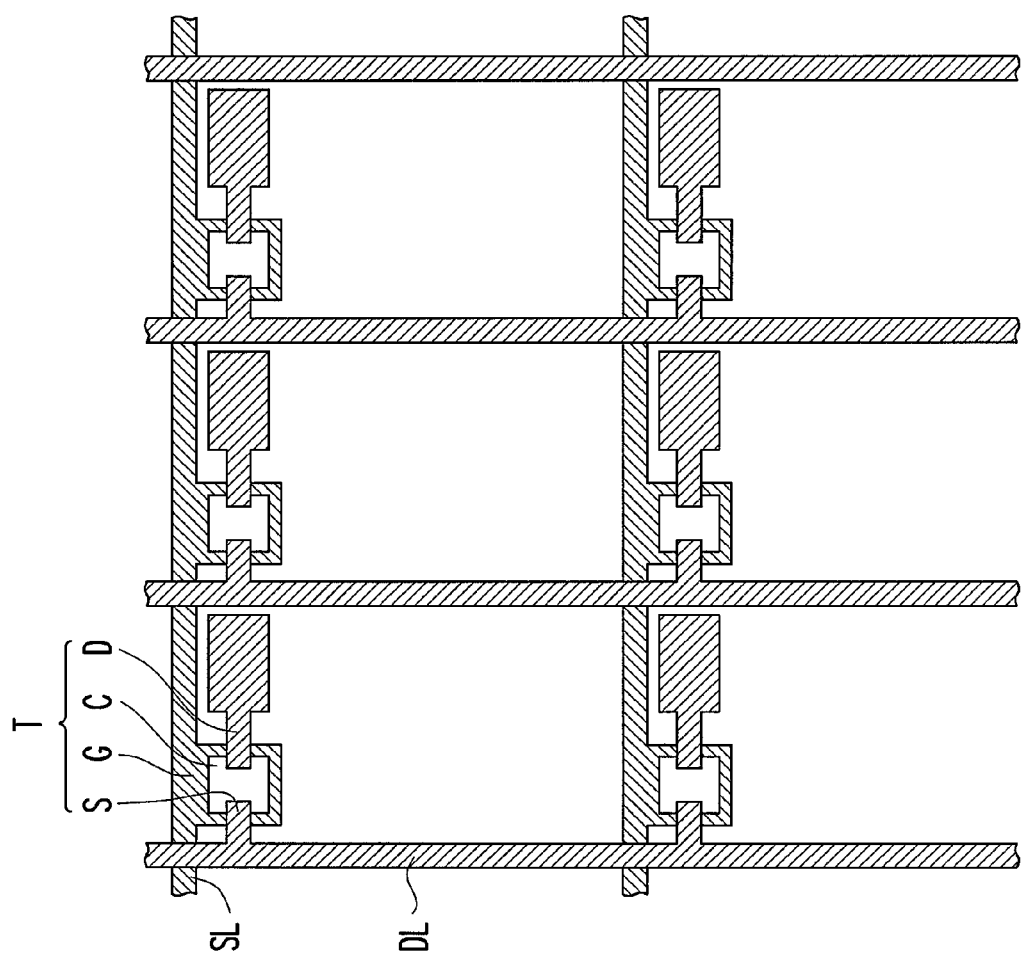
FIG. 10A is a top view of a pixel array of the first substrate of the display panel in FIG. 1.
Figure 10B:
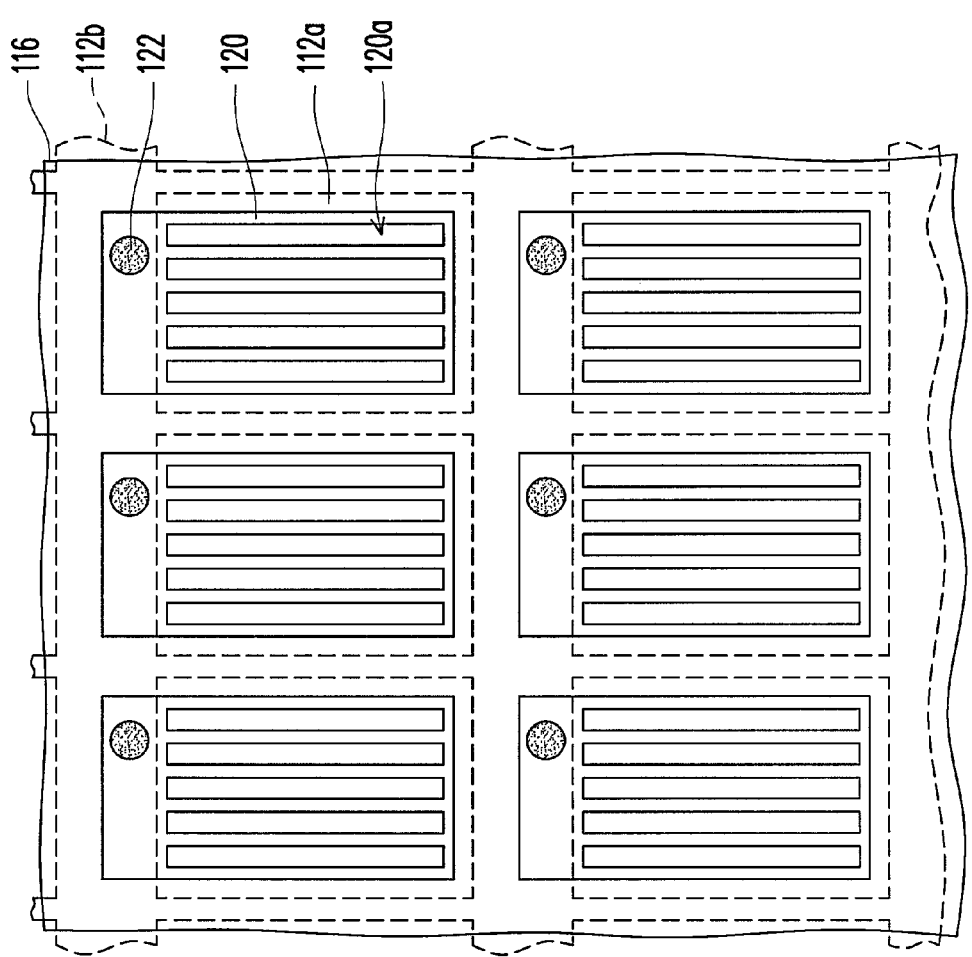
FIG. 10B is a top view of a pixel array of the second substrate of the display panel in FIG. 1.

It is noted that, one pixel structure of the display panel is shown in the FIG. 2A and FIG. 2B for clear illustration. Generally, a display panel is formed by a plurality of pixel structures arranged in an array (referred as a pixel array), which is known to the people skilled in the art. In the other words, the pixel array of the first substrate of the display panel is as shown in FIG. 10A, which is formed by a plurality of pixel structures of FIG. 2A. The pixel array of the second substrate of the display panel is as shown in FIG. 10B, which is formed by a plurality of pixel structures of FIG. 2B. In the following description, a single pixel structure (FIG. 2A and FIG. 2B) is mainly described, and FIG. 10A and FIG. 10B can be simultaneously referred to understand the display panel of the embodiment.

The first substrate 100 comprises a plate 101, a scan line SL, a data line DL and an active device T. The plate 101 (also called a first plate) may be glass, quartz, an organic polymer, an opaque/reflective material (such as a conductive material, silicon wafer, ceramics, or other suitable materials) or other suitable materials.

The scan line SL and the data line DL are disposed on the plate 101, and the scan line SL and the data line DL are arranged to cross over each other. In other words, the extending direction of the data line DL is not parallel to the extending direction of the scan line SL. Moreover, it is favorable for the extending direction of the data line DL to be perpendicular to the extending direction of the scan line SL. In addition, the scan line SL and the data line DL are in different layers. The scan line SL and the data line DL are usually fabricated using metal material for conductivity. However, the present invention is not limited herein. According to another embodiment, the scan line SL and the data line DL may be fabricated by other conductive materials (such as an alloy, a metal nitride material, a metal oxide material, a metal oxynitride material or other suitable materials) or other suitable materials or a stacked conductive layer.

The active device T is a bottom gate thin film transistor, for example, and comprises a gate G, a channel C, a source S and a drain D. The gate G is electrically connected to the scan line SL. The channel C is located above the gate G. An insulating layer 102 is further disposed between the gate G and the channel C, and it is also called a gate insulating layer. The source S and the drain D are located above the channel C, and the source S is electrically connected to the data line DL. A passivation layer 104 covers the active device T. According to another embodiment, the active device T may also be a top gate thin film transistor, which is the gate G is on the channel C.

In the embodiment, a conductive layer 106a may further be disposed on the passivation layer 104 above the active device T and a conductive layer 106b is disposed in the passivation layer 104. The conductive layers 106a, 106b comprise an oxidation-resistant metal or a metal oxide. The conductive layer 106a covers the active device T to shield photoelectric effect when the active device T is operated. The conductive layer 106b is disposed in the passivation layer 104 to electrically connect with the drain D of the active device T. In addition, the conductive layer 106b may be optionally electrically connected to the conductive layer 106a. In the embodiment, the conductive layer 106b is not electrically connected to the conductive layer 106a, but the present invention is not limited to this embodiment. In addition, the conductive layers 106a, 106b are not the essential elements, and thus the conductive layers 106a, 106b can be omitted in the other embodiments.

The second substrate 130 is disposed opposite to the first substrate 100, and comprises a plate 110 (also called a second plate), a common electrode layer 116, an insulating layer 118, a pixel electrode 120 and a contact structure 124. The plate 110 can be made of glass, quartz, an organic polymer, or other suitable materials.

According to an embodiment, the second substrate 130 further comprises a color filter pattern 112a, a light shielding pattern 112b and a planarization layer 114. The color filter patter 112a and the light shielding pattern 112b on the plate 110 form a color filter array. For a pixel structure, the color filter pattern 112a may be any one of red, green and blue color filter pattern. The light shielding pattern 112b may be a metal material or a black resin material, and it is also called a black matrix. The planarization layer 114 covers the color filter pattern 112a and the light shielding pattern 112b. Preferably, the planarization layer 114 is a non-patterned film layer, but the present invention is not limited herein. The planarization layer 114 comprises an inorganic material (e.g. silicon oxide, silicon nitride, silicon oxynitride, other suitable materials, or a stacked layer of the above materials), an organic material (e.g. polyester, polyethylene, cycloolefin, polyimide, polyamide, polyalcohols, polyphenylene, polyether, polyketone, other suitable materials, or a combination thereof), or a combination of the above.

The common electrode layer 116 is disposed on the planarization layer 114. The common electrode layer 116 is a non-patterned film layer, and thus the common electrode layer 116 entirely covers the plate 110 (the planarization layer 114). The common electrode layer 116 is a transparent conductive layer and comprises a metal oxide, such as indium tin oxide (ITO), indium zinc oxide (IZO), aluminum zinc oxide (AZO), aluminum tin oxide (ATO), indium tin zinc oxide (ITZO), other suitable materials, or a stacked layer of above materials. In addition, the common electrode 116 is electrically connected to a common voltage, and thus the common electrode 116 is also called a reference electrode. Moreover, the common electrode layer 116 transmits a common single, such as a common electric potential, but the present invention is not limited herein.

The insulating layer 118 covers the common electrode layer 116. The insulating layer 118 comprises an inorganic material (e.g. silicon oxide, silicon nitride, silicon oxynitride, other suitable materials, or a stacked layer of the above materials), an organic material, or a combination of the above.

The pixel electrode 120 is formed on the insulating layer 118. According to the embodiment, the pixel electrode 120 has a branch-shaped pattern, as shown in FIG. 2B. In details, the pixel electrode 120 has a plurality of slender openings 120a parallel to each other to expose the insulating layer 118 underneath. The pixel electrode 120 is a transparent conductive material comprising a metal oxide, such as indium tin oxide (ITO), indium zinc oxide (IZO), aluminum zinc oxide (AZO), aluminum tin oxide (ATO), indium tin zinc oxide (ITZO), other suitable materials, or a stacked layer of above materials. In addition, the pixel electrodes 120 of the pixel structures are separated from each other, as shown in FIG. 10B.

The contact structure 124 is disposed on the insulating layer 118. The contact structure 124 is electrically connected with the pixel electrode 120 and the active device T on the first substrate 130. In the embodiment of FIG. 1, FIG. 2A and FIG. 2B, the contact structure 124 is constituted by an insulating spacer 122 and the pixel electrode 120 covering the insulating spacer 122. The contact structure 124 electrically contacts the conductive layer 106b on the first substrate 100, such that the pixel electrode 120 on the second substrate 130 is electrically connected to the active device T on the first substrate 100. According to another embodiment, if the conductive layer 106b is not disposed on the first substrate 100, the contact structure 124 is electrically connected to the active device T on the first substrate 100 directly, so as to make the pixel electrode 120 on the second substrate 130 being electrically connected to the active device T on the first substrate 100.

It is noted that, as shown in FIG. 10B, each pixel structure of the second substrate has one insulating spacer 122, and each pixel electrode 120 covers the corresponding insulating spacer 122, such that the pixel electrode 120 on the second substrate 130 is electrically connected to the corresponding active device T on the first substrate 100.

As above mentioned, in the present embodiment, the pixel electrode 120 is disposed on the second substrate 130 and the pixel electrode 120 is electrically connected to the active device T through the contact structure 124. Therefore, a driving signal (such as a pixel electric potential) passing the active device T is transmitted to the pixel electrode 120 on the second substrate 130 through the contact structure 124, so as to control or switch the display medium 150 on the pixel electrode 120. Moreover, the common electrode layer 116 and the pixel electrode 120 are disposed on the second substrate 130. When a finger touches the display panel (the outer surface of the second substrate 130), the electric field in the display panel is not changed. Therefore, an additional transparent conductive layer is not needed to form on the outer surface of the second substrate 130, so as to avoid the transmittance of the display panel being reduced. In addition, the common electrode layer 116 is disposed on the second substrate 130, and thereby coupling effect between the common electrode layer 116 and the scan line SL/data line DL on the first substrate 100 is not generated, and the signals transmitted on the scan line SL and the data line DL are not influenced by said coupling effect.

Figure 3:
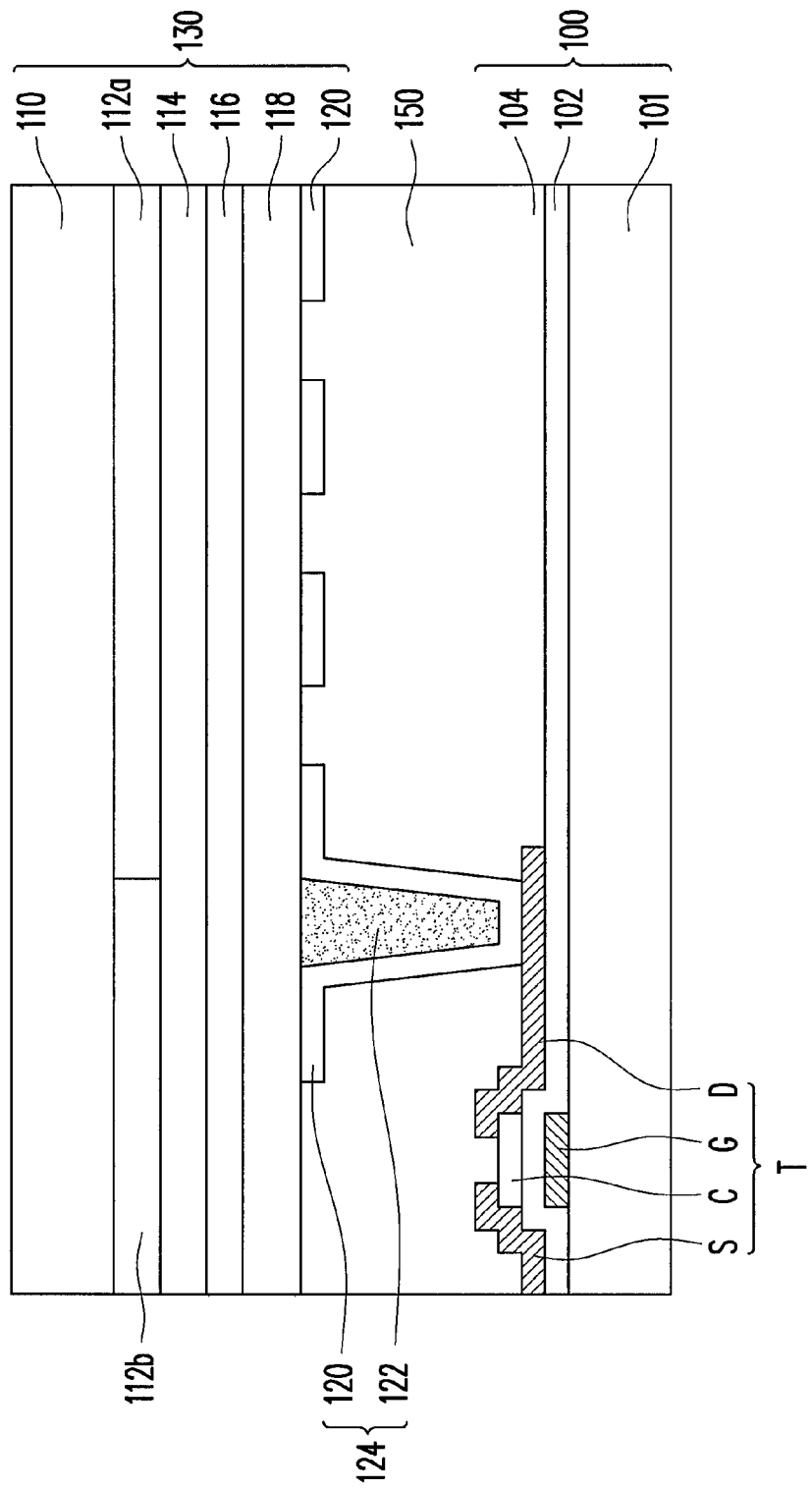
FIG. 3 and FIG. 4 are schematic cross-sectional views of a display panel according to embodiments of the present invention.

FIG. 3 is a schematic cross-sectional view of a display panel according to an embodiment of the present invention. Referring to FIG. 3, the embodiment shown in FIG. 3 is similar to the embodiment shown in FIG. 1 so that components identical to those of FIG. 1 will be denoted with the same numerals in FIG. 3 and not repeated herein. The difference between the embodiment of FIG. 3 and the embodiment of FIG. 1 is that the source S and the drain D of the active device T on the first substrate 100 comprise an oxidation-resistant metal or a metal oxide. Because the source S and the drain D comprise an oxidation-resistant metal or a metal oxide (such as indium tin oxide or indium zinc oxide), the passivation layer can be omitted in the embodiment. That is, the active device T is not covered by the passivation layer and is exposed, and thus the contact structure 124 directly contacts the drain D of the exposed active device T.

Figure 4:
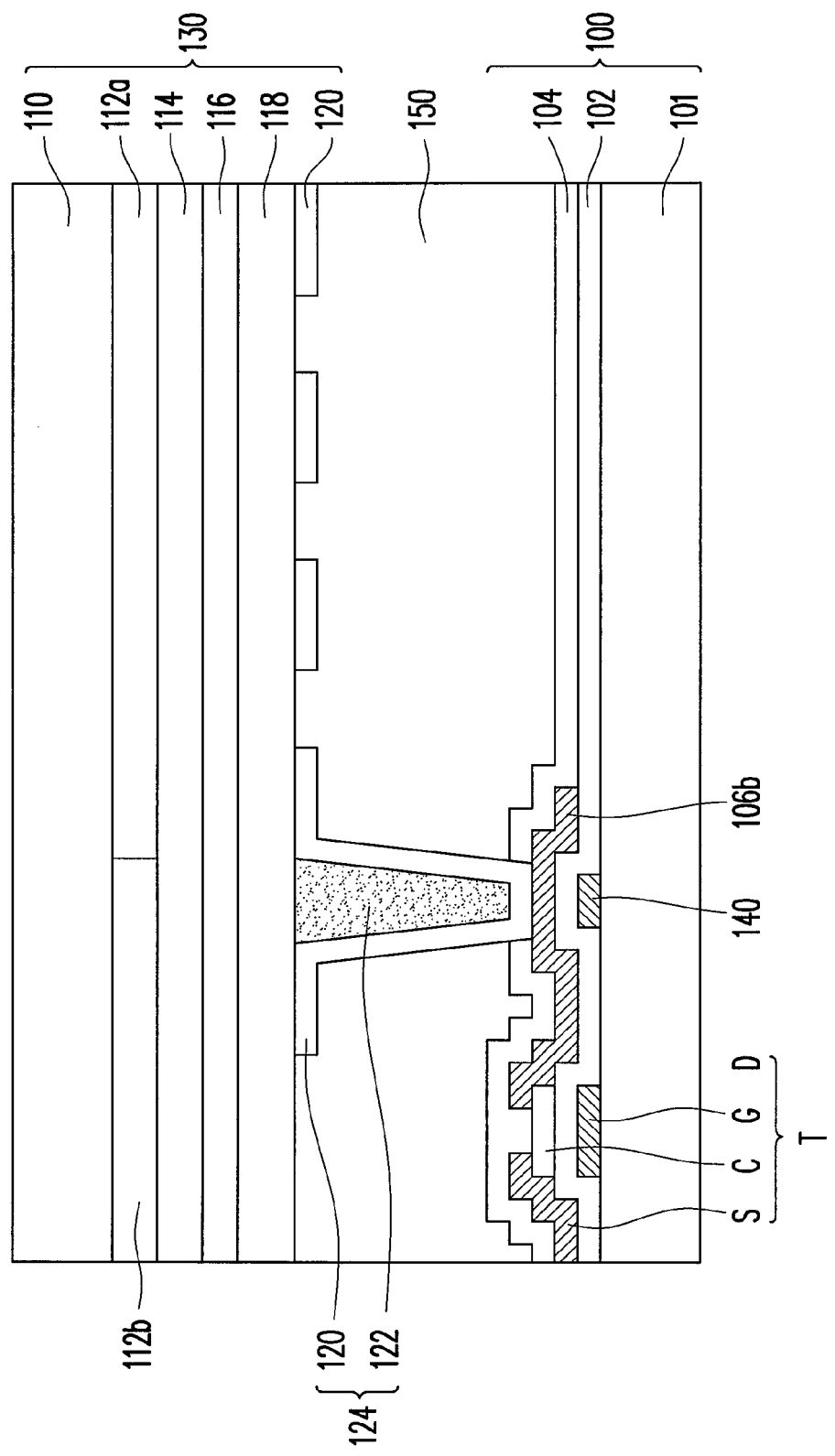

FIG. 4 is a schematic cross-sectional view of a display panel according to an embodiment of the present invention. Referring to FIG. 4, the embodiment shown in FIG. 4 is similar to the embodiment shown in FIG. 1 so that components identical to those of FIG. 1 will be denoted with the same numerals in FIG. 4 and not repeated herein. The difference between the embodiment of FIG. 4 and the embodiment of FIG. 1 is that the first substrate 100 further comprises one or more stacked pattern 140 (the drawing only shows one, but it may be two or more), the drain D of the active device T covers the stacked pattern 140, and the stacked pattern 140 is disposed corresponding to the contact structure 124 on the second substrate 130. The stacked pattern 140 may be a single-film layer or a multiple-film layer, and the stacked pattern 140 may be patterns having different sizes. The staked pattern 140 raises the drain D of the active device T, such that electric conductivity between the drain D of the active device T and the contact structure 124 is increased. In the embodiment, the stacked pattern 140 is floating.

Figure 9A:
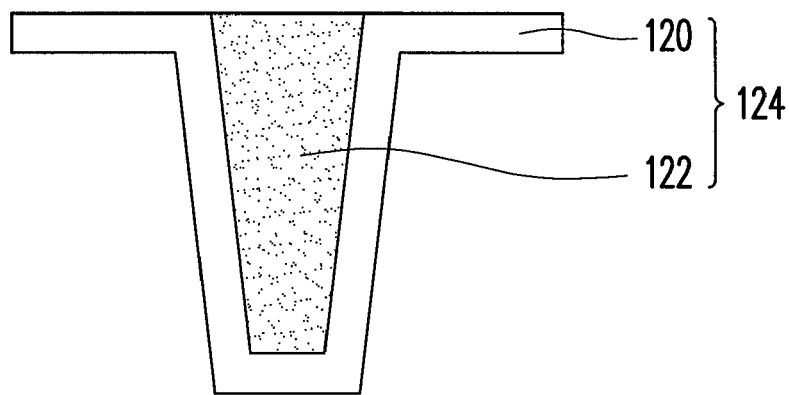
FIG. 9A to FIG. 9D are schematic cross-sectional views of a contact structure according to embodiments of the present invention.
Figure 9B:
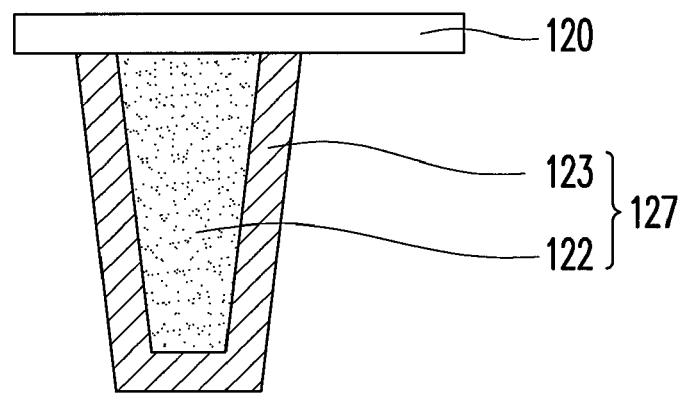
Figure 9C:
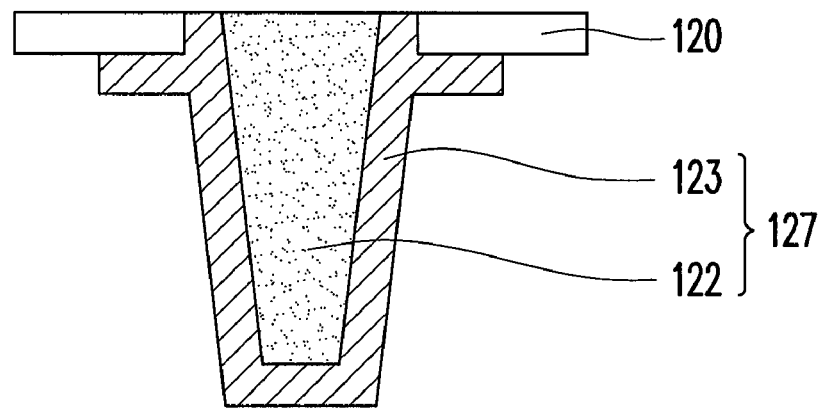
Figure 9D:
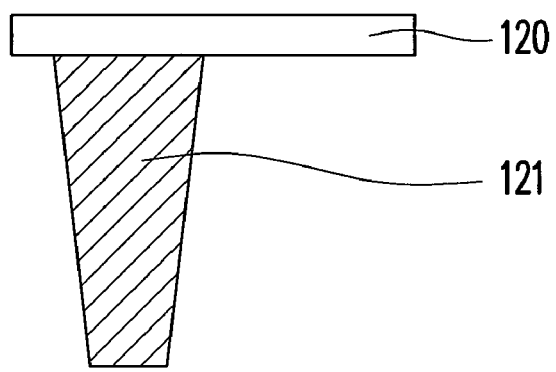

In the above embodiments, the contact structure 124 is constituted by the insulating spacer 122 and the pixel electrode 120 covering the insulating spacer 122, but the present invention is not limited to these embodiments. According to other embodiments, the contact structure may also be other structures. Referring to FIG. 9A to FIG. 9D, the contact structure 124 in FIG. 9A is constituted by the insulating spacer 122 and the pixel electrode 120 covering the insulating spacer 122. The contact structure 127 in FIG. 9B is constituted by an insulating spacer 122 and a conductive material layer 123 covering the insulating spacer 122, wherein the insulating spacer 122 is disposed on the pixel electrode 120, and the conductive material layer 123 covers the insulating spacer 122 and electrically connects to the pixel electrode 120. Herein, the material of the conductive layer 123 may be the same to or different from that of the pixel electrode 120. In consideration of electrical conductivity, the conductive layer 123 is normally made of a metallic material, and it may comprise a material the same to that of the scan line or the data line, for example. The contact structure 127 in FIG. 9C is constituted by an insulating spacer 122 and a conductive material layer 123 covering the insulating spacer 122, wherein the insulating spacer 122 is not directly disposed on the pixel electrode 120, and the conductive material layer 122 covering the insulating spacer 122 is electrically connected with the pixel electrode 120. Furthermore, the contact structure shown in FIG. 9D is simply formed by a conductive spacer 121. It is noted that, the contact structures shown in FIG. 9B to FIG. 9D may be applied to the display panel of FIG. 1, FIG. 3 or FIG. 4, which is the contact structure 124 of the display panel shown in FIG. 1, FIG. 3 or FIG. 4 can be replaced by any one of the contact structures shown in FIG. 9B to FIG. 9D.

The display panels in the above embodiments are fringe field switching (FFS) display panels or advanced fringe filed switching (AFFS) display panels. The structure of disposing the pixel electrode on the second substrate and electrically connecting the active device and the pixel electrode by a contact structure can also be applied to in-plane switching (IPS) display panels, super-in plane switching (S-IPS) display panels, or advanced super in-plane switching (AS-IPS) display panels.

Figure 5:
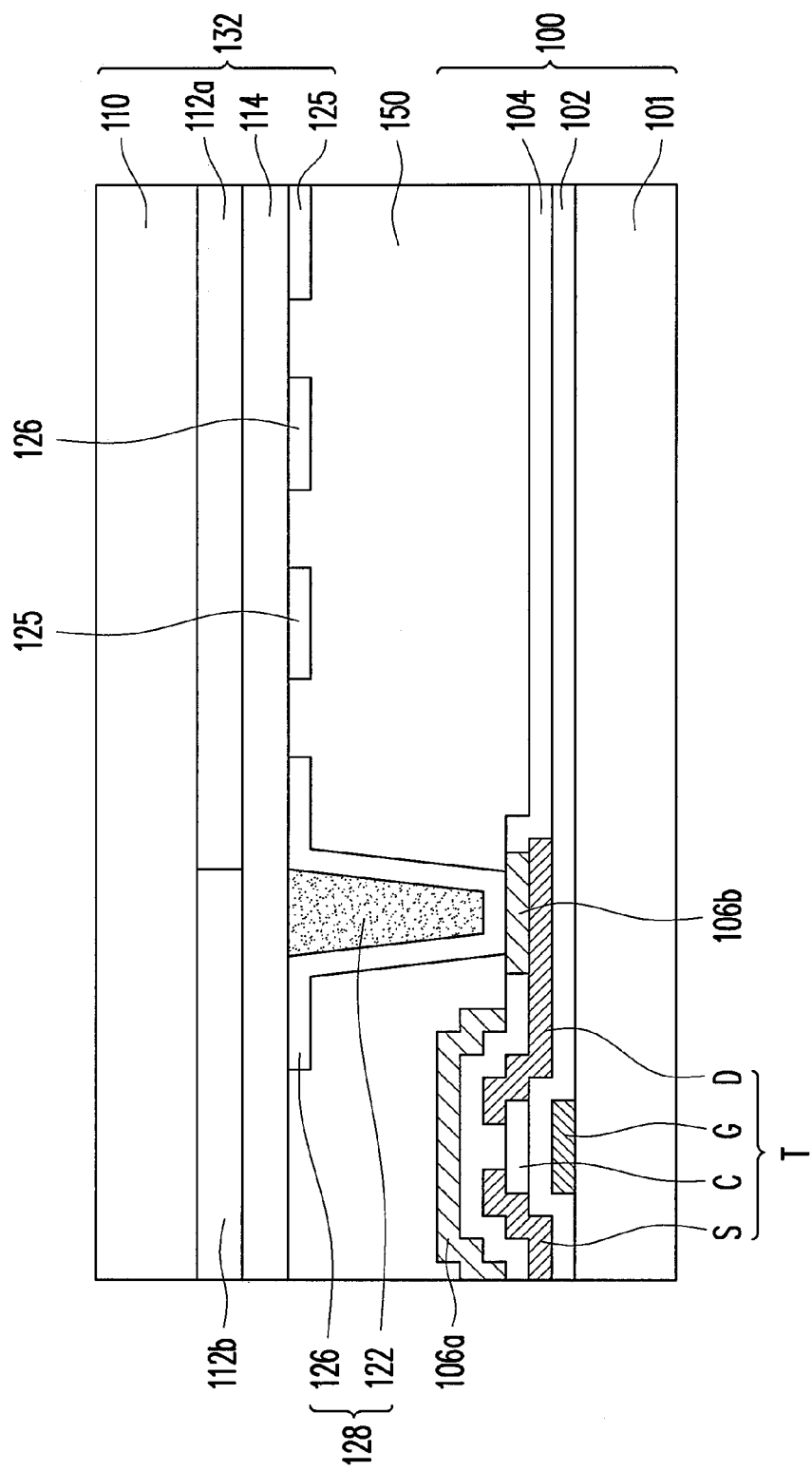
FIG. 5 is a schematic cross-sectional view of a display panel according to an embodiment of the present invention.
Figure 6A:
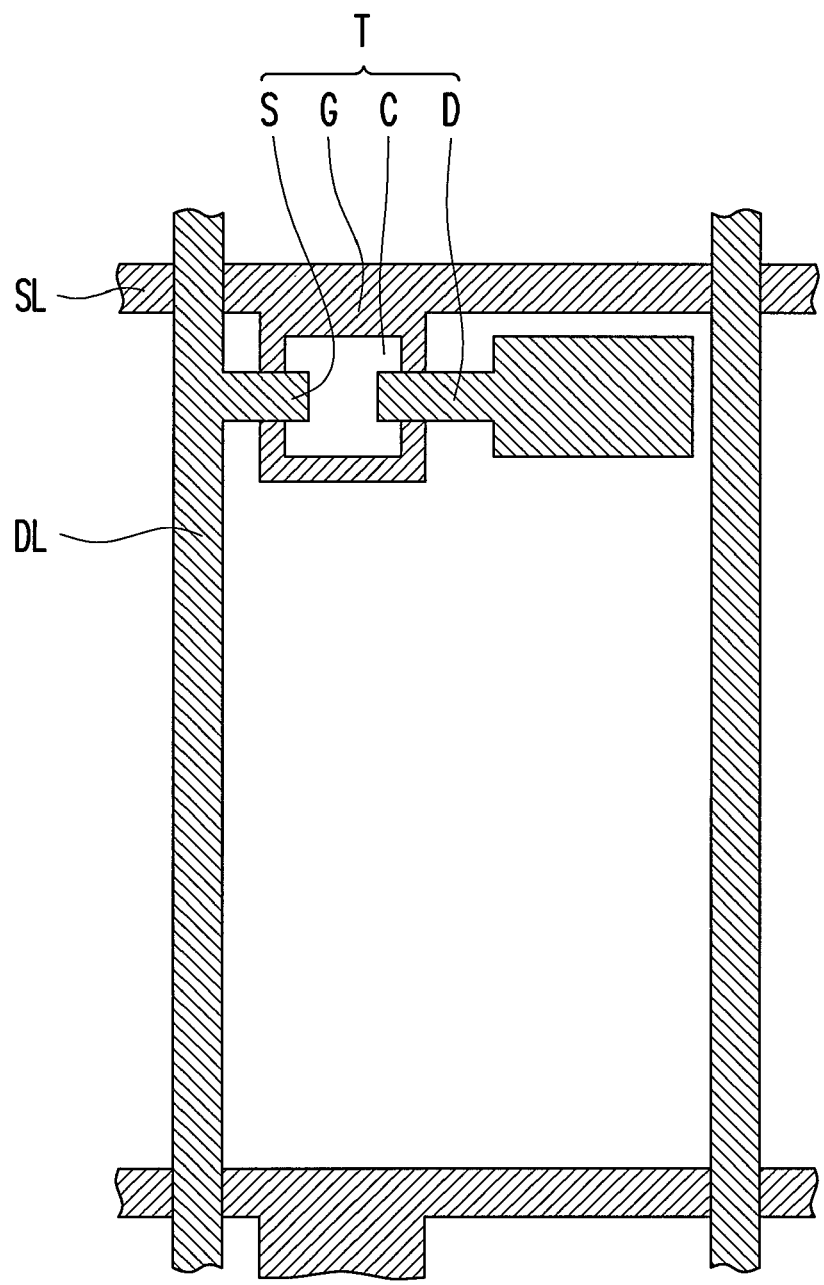
FIG. 6A is a top view of the first substrate of the display panel in FIG. 5.
Figure 6B:
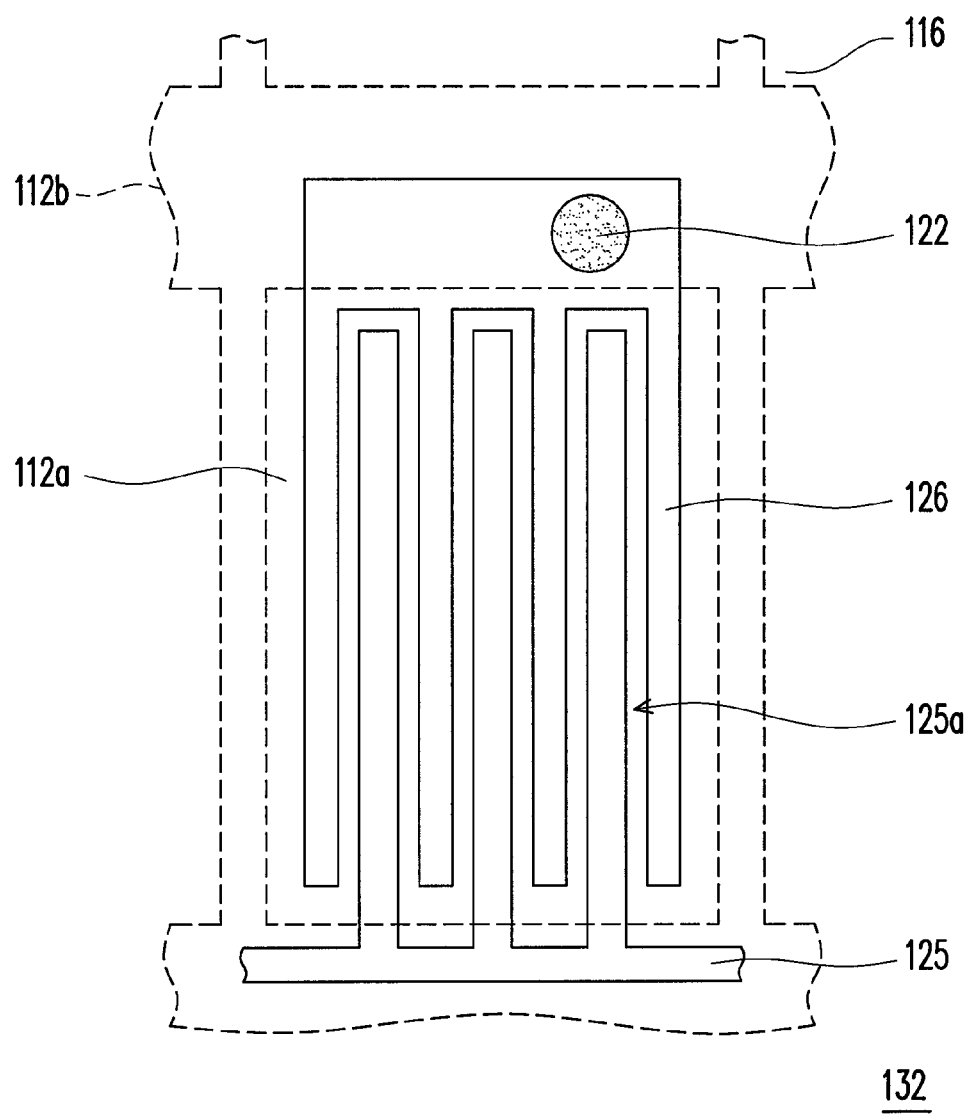
FIG. 6B is a top view of the second substrate of the display panel in FIG. 5.

FIG. 5 is a schematic cross-sectional view of a display panel according to an embodiment of the present invention. FIG. 6A is a top view of the first substrate of the display panel in FIG. 5. FIG. 6B is a top view of the second substrate of the display panel in FIG. 5. Referring to FIG. 5, FIG. 6A and FIG. 6B, the embodiment shown in FIG. 5 (FIG. 6A and FIG. 6B) is similar to the embodiment shown in FIG. 1 (FIG. 2A and FIG. 2B) so that components identical to those of FIG. 1 will be denoted with the same numerals in FIG. 5 and not repeated herein.

Figure 11A:
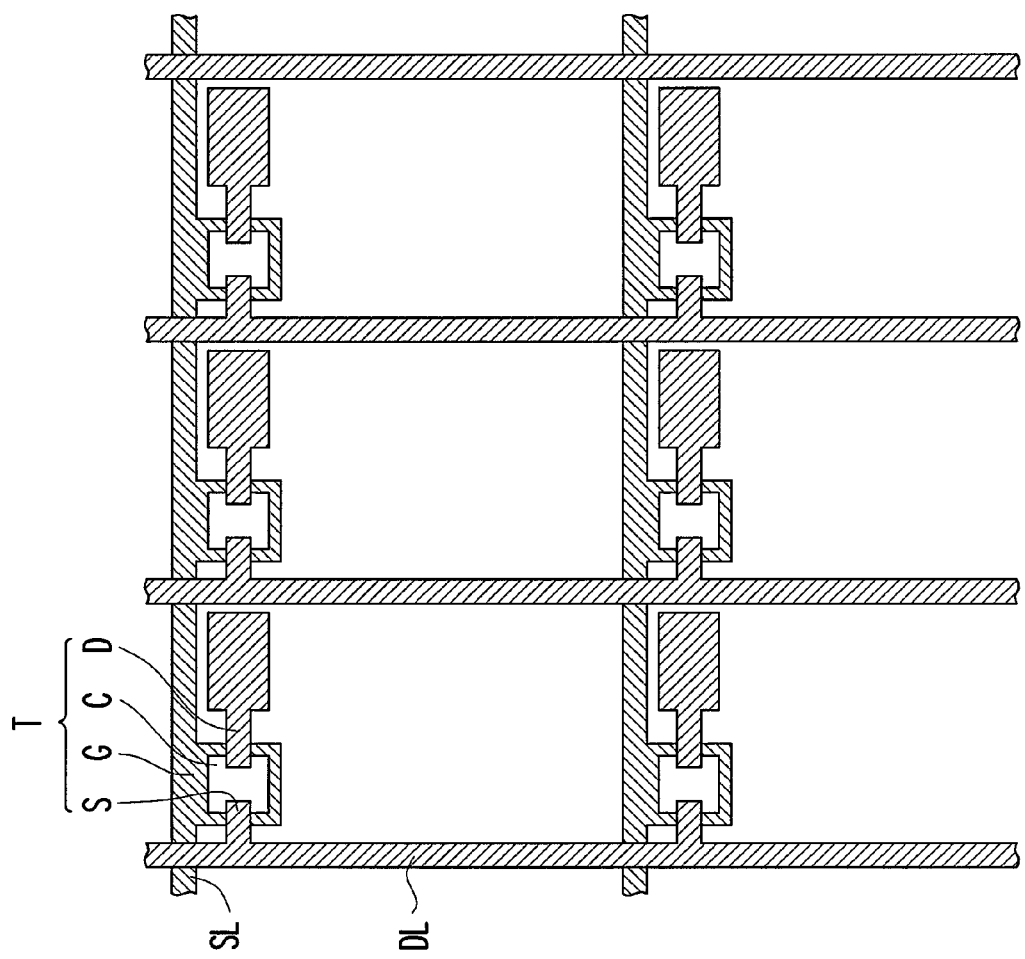
FIG. 11A is a top view of a pixel array of the first substrate of the display panel in FIG. 5.
Figure 11B:
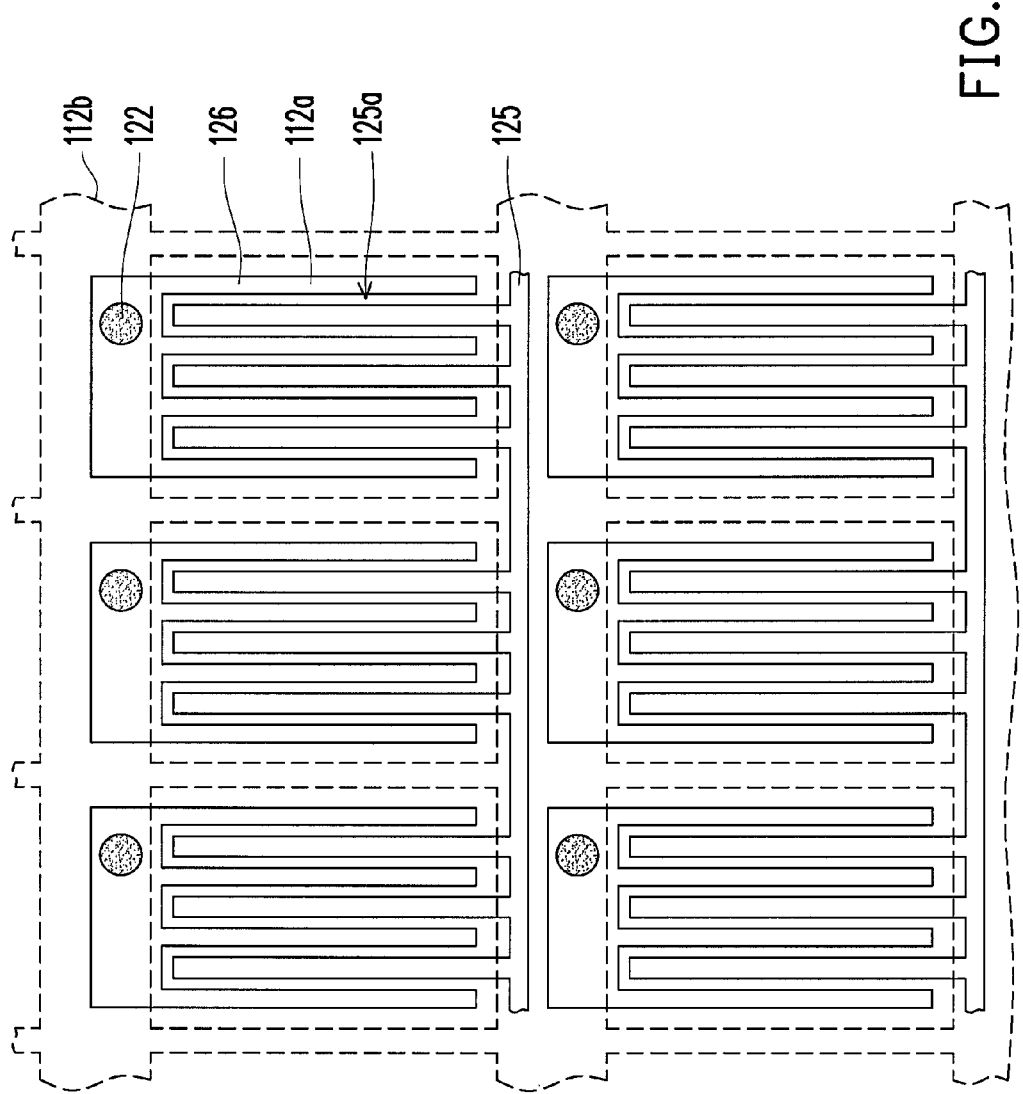
FIG. 11B is a top view of a pixel array of the second substrate of the display panel in FIG. 5.

Similarly, one pixel structure of the display panel is shown in the FIG. 6A and FIG. 6B for clear illustration. Generally, a display panel is formed by a plurality of pixel structures arranged in an array (referred as a pixel array), which is known to the people skilled in the art. In the other words, the pixel array of the first substrate of the display panel is as shown in FIG. 11A, which is formed by a plurality of pixel structures of FIG. 6A. The pixel array of the second substrate of the display panel is as shown in FIG. 11B, which is formed by a plurality of pixel structures of FIG. 6B. In the following description, a single pixel structure (FIG. 6A and FIG. 6B) is mainly described, and FIG. 11A and FIG. 11B can be simultaneously referred to understand the display panel of the embodiment.

The difference between the embodiment of FIG. 5 (FIG. 6A and FIG. 6B) and the embodiment of FIG. 1 (FIG. 2A and FIG. 2B) is that the second substrate 132 comprises a plate 110, a pixel electrode 126, a common electrode 125 and a contact structure 128. Similarly, according to an embodiment, the second substrate 132 may further comprise a color filter pattern 112a, a light shielding pattern 112b and a planarization layer 114.

In the embodiment, the pixel electrode 126 and the common electrode 125 respectively have a branch-shaped pattern, as shown in FIG. 6B, and the pixel electrode 126 and the common electrode 125 are alternatively arranged. In other words, slender openings 125a are between the pixel electrode 126 and the common electrode 125 such that the pixel electrode 126 and the common electrode 125 are electrically insulate from each other. In addition, the common electrode 125 of each pixel structure is electrically connected to a common voltage. The pixel electrode 126 and the common electrode 125 may respectively be a transparent conductive material comprising a metal oxide, such as indium tin oxide (ITO), indium zinc oxide (IZO), aluminum zinc oxide (AZO), aluminum tin oxide (ATO), indium tin zinc oxide (ITZO), other suitable materials, or a stacked layer of above materials.

It is noted, the pixel electrodes 126 of the pixel structures are separated from each other, as shown in FIG. 11B. The common electrodes 125 in the pixel structures arranged in the same row are connected to each other, or electrically connected to each other by other connecting methods.

Similarly, the contact structure 128 is electrically connected to the pixel electrode 126 and electrically connected to the active device T on the first substrate 100. In the embodiment of FIG. 5, the contact structure 128 is constituted by an insulating spacer 122 and the pixel electrode 126 covering the insulating spacer 122. The contact structure 128 is electrically connected the conductive layer 106b on the first substrate 100, such that the pixel electrode 120 on the second substrate 132 is electrically connected to the active device T on the first substrate 100. In addition, the conductive layer 106b may be optionally electrically connected to the conductive layer 106a. In the embodiment, the conductive layer 106b is not electrically connected to the conductive layer 106a, but the present invention is not limited to this embodiment. According to another embodiment, if the conductive layer 106b is not disposed on the first substrate 100, the contact structure 128 is electrically connected to the active device T on the first substrate 100 directly, such that the pixel electrode 126 on the second substrate 132 is electrically connected to the active device T on the first substrate 100.

As shown in FIG. 11B, each pixel structure of the second substrate has one insulating spacer 122, and each pixel electrode 126 covers the corresponding insulating spacer 122, such that the pixel electrode 126 on the second substrate is electrically connected to the corresponding active device T on the first substrate 100.

As above mentioned, in the present embodiment, the pixel electrode 126 is disposed on the second substrate 132 and the pixel electrode 126 is electrically connected to the active device T through the contact structure 128. Therefore, a driving signal (such as a pixel electric potential) passing the active device T is transmitted to the pixel electrode 126 on the second substrate 132 through the contact structure 128, so as to control or switch the display medium 150 on the pixel electrode 126. In addition, the common electrode 125 and the pixel electrode 126 are disposed on the second substrate 132. When a finger touches the display panel (the outer surface of the second substrate 132), the electric field in the display panel is not changed. Therefore, an additional transparent conductive layer is not needed to form on the outer surface of the second substrate 132, so as to avoid the transmittance of the display panel being reduced. Moreover, the common electrode 125 is disposed on the second substrate 132, and thereby coupling effect between the common electrode 125 and the scan line SL/data line DL on the first substrate 100 is not generated, and the signals transmitted on the scan line SL and the data line DL are not influenced by said coupling effect.

Figure 7:
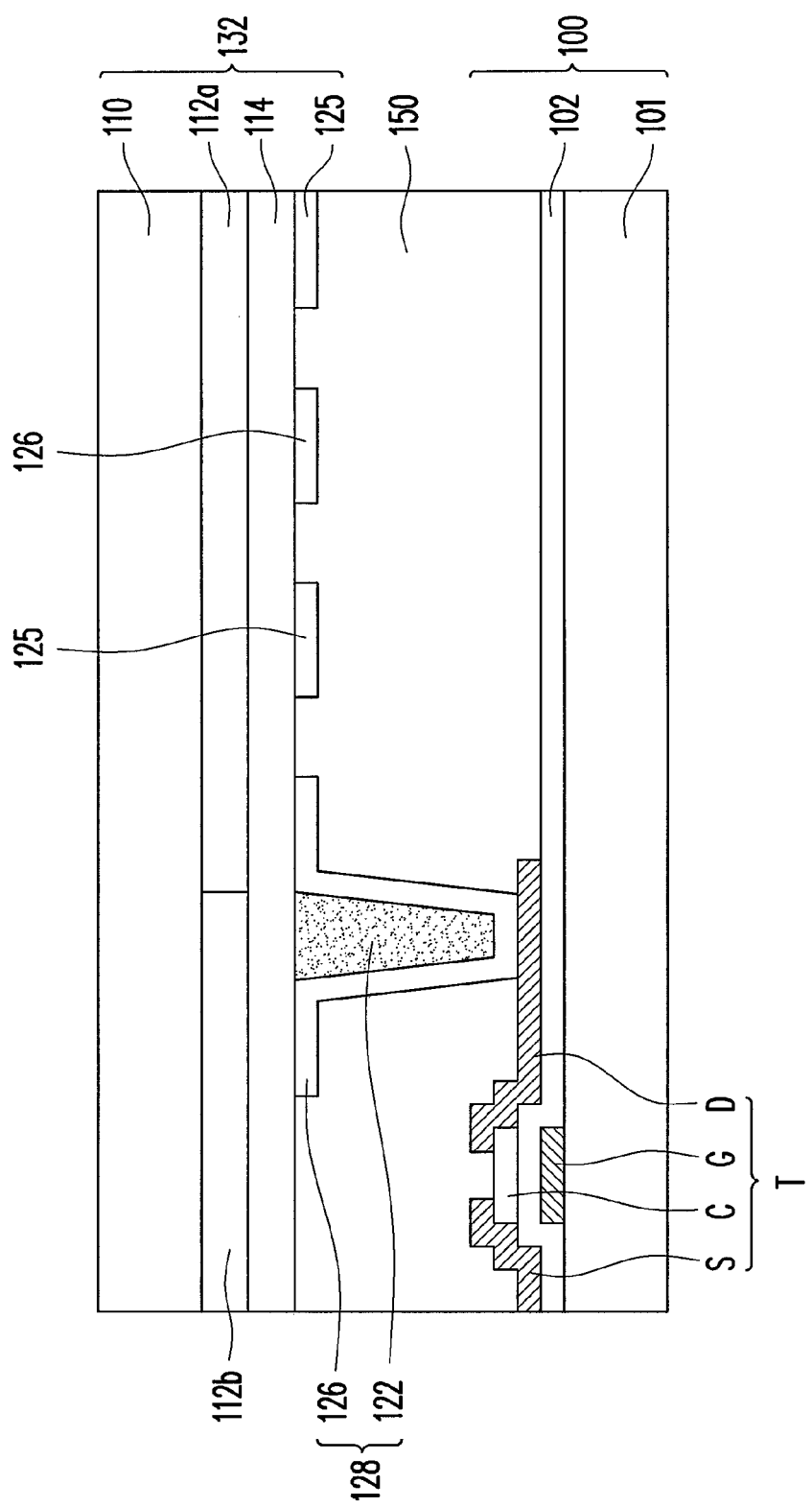
FIG. 7 and FIG. 8 are schematic cross-sectional views of a display panel according to embodiments of the present invention.

FIG. 7 is a schematic cross-sectional view of a display panel according to an embodiment of the present invention. Referring to FIG. 7, the embodiment shown in FIG. 7 is similar to the embodiment shown in FIG. 5 so that components identical to those of FIG. 5 will be denoted with the same numerals in FIG. 7 and not repeated herein. The difference between the embodiment of FIG. 7 and the embodiment of FIG. 5 is that the source S and the drain D of the active device T on the first substrate 100 comprise an oxidation-resistant metal or a metal oxide. Because the source S and the drain D comprise an oxidation-resistant metal or a metal oxide (such as indium tin oxide or indium zinc oxide), the passivation can be omitted in the embodiment. That is, the active device T is not covered by the passivation layer and is exposed, and thus the contact structure 128 directly contacts the drain D of the exposed active device T.

Figure 8:
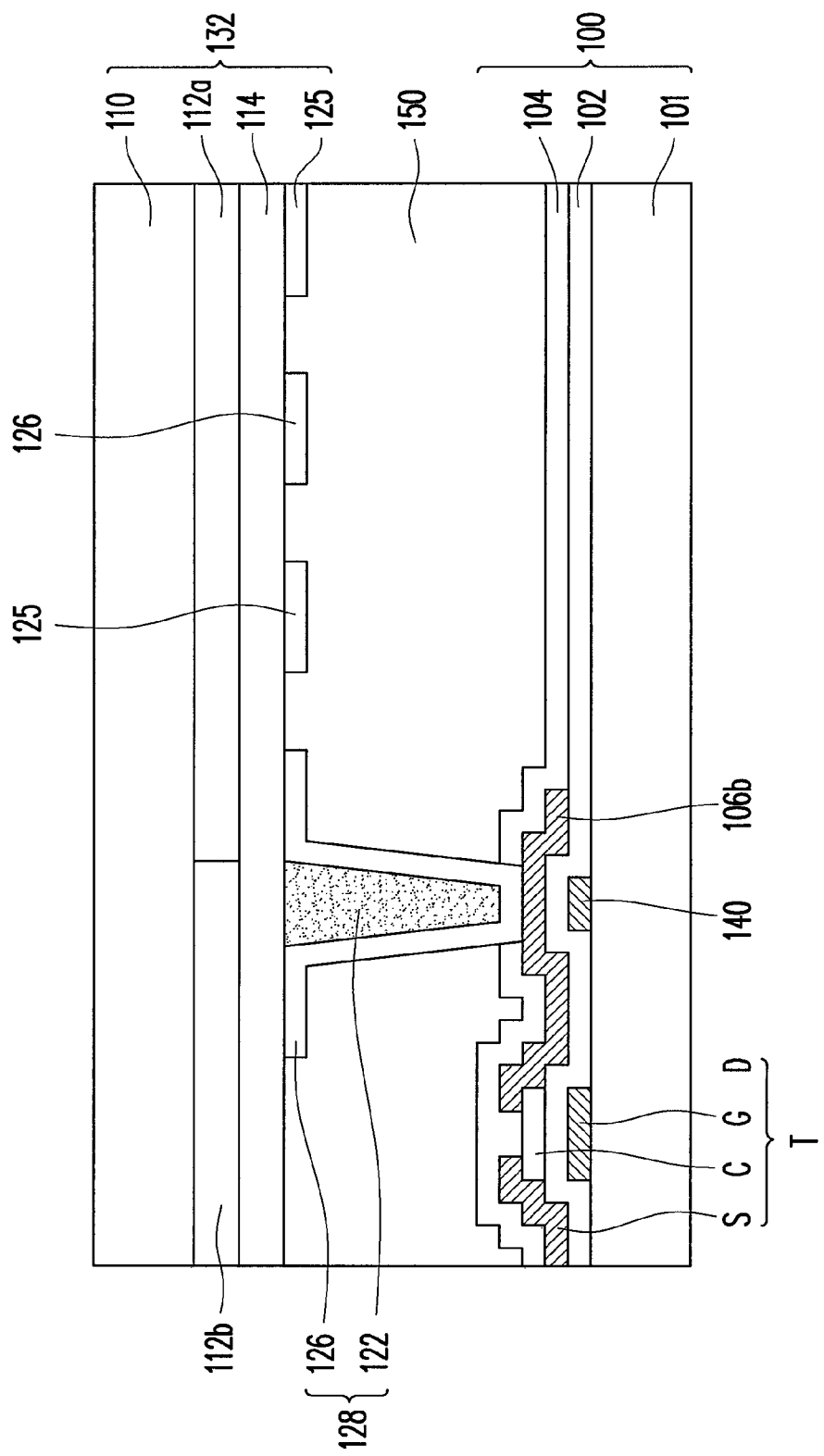

FIG. 8 is a schematic cross-sectional view of a display panel according to an embodiment of the present invention. Referring to FIG. 8, the embodiment shown in FIG. 8 is similar to the embodiment shown in FIG. 5 so that components identical to those of FIG. 5 will be denoted with the same numerals in FIG. 8 and not repeated herein. The difference between the embodiment of FIG. 8 and the embodiment of FIG. 5 and is that the first substrate 100 further comprises one or more stacked pattern 140 (the drawing only shows one, but it may be two or more), the drain D of the active device T covers the stacked pattern 140, and the stacked pattern 140 is disposed corresponding to the contact structure 124 on the second substrate 130. The stacked pattern 140 may be a single-film layer or a multiple-film layer, and the stacked pattern 140 may be patterns having different sizes. The staked pattern 140 raises the drain D of the active device T, such that electric conductivity between the drain D of the active device T and the contact structure 128 is increased.

In the above embodiments, the contact structure 128 is constituted by the insulating spacer 122 and the pixel electrode 126 covering the insulating spacer 122, but the present invention is not limited to these embodiments. The contact structure 127 in FIG. 9B is constituted by an insulating spacer 122 and a conductive material layer 123 covering the insulating spacer 122, wherein the insulating spacer 122 is disposed on the pixel electrode 120, and the conductive material layer 123 covers the insulating spacer 122 and electrically connects to the pixel electrode 120. Herein, the material of the conductive layer 123 may be the same to or different from that of the pixel electrode 120. In consideration of electrical conductivity, the conductive layer 123 is normally made of a metallic material, and it may comprise a material the same to that of scan lines or data lines, for example. The contact structure 127 in FIG. 9C is constituted by an insulating spacer 122 and a conductive material layer 123 covering the insulating spacer 122, wherein the insulating spacer 122 is not directly disposed on the pixel electrode 120, and the conductive material layer 122 covering the insulating spacer 122 electrically connects with the pixel electrode 120. Furthermore, the contact structure shown in FIG. 9D is simply formed by a conductive spacer 121. Similarly, the contact structures shown in FIG. 9B to FIG. 9D can be applied to the display panel shown in any one of FIG. 5, FIG. 7 or FIG. 8.

In addition, in the above embodiments (FIG. 1, FIG. 3, FIG. 4, FIG. 5, FIG. 7 and FIG. 8), the color filter pattern 112a is disposed on the plate 110, for example, but the present invention does not limit to these embodiments. In another embodiment, the color filter pattern 112a may be selectively disposed on the plate 101. If the color filter pattern 112a is disposed on the active device T, this structure is called a color filter on array (COA). The color filter pattern 112a can also be disposed under the active device T, and this structure is called an array on color filter (AOC).

In addition, in the above embodiments (FIG. 1, FIG. 3, FIG. 4, FIG. 5, FIG. 7 and FIG. 8), the light shielding layer 112b is disposed on the plate 110, for example, but the present invention does not limit to these embodiments. According to another embodiment, the light shielding layer 112b is selectively disposed on the plate 101, which is the light shielding layer 112b is disposed on the active device T, and this structure is called a black matrix on array (BOA).

In addition to the above embodiments, in another embodiment, the light shielding pattern 112b and the color filter pattern 112a are both disposed on the plate 101, the planarization layer 114 on the plate 110 can be selectively omitted. In this embodiment, the common electrode 126 is directly formed on the plate 110.

According to the aforementioned, the pixel electrode and the common electrode layer (the common electrode) are disposed on the second substrate. When a finger touches the display panel (the second substrate), the electric field in the display panel is not changed. Therefore, a transparent conductive layer is not needed to form on the outer surface of the second substrate, so as to avoid the transmittance of the display panel being reduced.

Furthermore, the common electrode layer (the common electrode) of the display panel is disposed on the second substrate, and thereby coupling effect between the common electrode layer (the common electrode) and the scan line/data line on the first substrate is not generated, and the signals transmitted on the scan line and the data line are not influenced by said coupling effect. Accordingly, the loading on the common electrode layer (the common electrode) can also be reduced.

It will be apparent to those skilled in the art that various modifications and variations can be made to the structure of the present invention without departing from the scope or spirit of the present invention. In view of the foregoing, it is intended that the present invention cover modifications and variations of the present invention provided they fall within the scope of the following claims and their equivalents.

What is claimed is:

1. A display panel comprising:
   a first substrate, comprising:
   a scan line and a data line;
   an active device, electrically connected to the scan line and the data line;
   a second substrate, disposed opposite to the first substrate and comprising:
   a common electrode layer;
   an insulating layer, covering the common electrode layer;
   a pixel electrode, disposed on the insulating layer;
   a contact structure, disposed on the insulating layer, wherein the contact structure is electrically connected to the pixel electrode and electrically connected to the active device on the first substrate; and
   a display medium located between the first substrate and the second substrate.

2. The display panel of claim 1, wherein the contact structure is constituted by an insulating spacer and the pixel electrode covering the insulating spacer.

3. The display panel of claim 1, wherein the contact structure is constituted by an insulating spacer and a conductive material layer covering the insulating spacer, and the conductive material layer is electrically connected to the pixel electrode.

4. The display panel of claim 1, wherein the contact structure is a conductive spacer.

5. The display panel of claim 1, wherein the first substrate further comprises:
   a passivation layer covering the active device; and
   a conductive layer, disposed on the passivation layer above the active device.

6. The display panel of claim 5, wherein the conductive layer is electrically connected to the active device, and the contact structure electrically contacts the conductive layer.

7. The display panel of claim 5, wherein the conductive layer comprises an oxidation-resistant metal or a metal oxide.

8. The display panel of claim 1, wherein the first substrate further comprises one or more stacked pattern, the active device covers the stacked pattern, and the stacked pattern is disposed corresponding to the contact structure on the second substrate.

9. The display panel of claim 1, wherein the second substrate further comprises:
   a color filter array;
   a planarization layer, covering the color filter array, and the common electrode layer is on the planarization layer.

10. The display panel of claim 1, wherein the active device is a thin film transistor having a gate, a source and a drain, and the source and the drain comprise an oxidation-resistant metal or a metal oxide.

11. The display panel of claim 1, wherein the pixel electrode has a branch-shaped pattern.

12. A display panel comprising:
    a first substrate, comprising:
    a scan line and a data line;
    an active device, electrically connected to the scan line and the data line;
    a second substrate, disposed opposite to the first substrate and comprising:
    a pixel electrode;
    a contact structure, electrically connected to the pixel electrode and electrically connected to the active device on the first substrate;
    a common electrode, alternatively arranged with the pixel electrode; and
    a display medium located between the first substrate and the second substrate.

13. The display panel of claim 12, wherein the contact structure is constituted by an insulating spacer and the pixel electrode covering the insulating spacer.

14. The display panel of claim 12, wherein the contact structure is constituted by an insulating spacer and a conductive material layer covering the insulating spacer, and the conductive material layer is electrically connected to the pixel electrode.

15. The display panel of claim 12, wherein the contact structure is a conductive spacer.

16. The display panel of claim 12, wherein the first substrate further comprises:
 a passivation layer covering the active device; and
 a conductive layer, disposed on the passivation layer above the active device.

17. The display panel of claim 16, wherein the conductive layer is electrically connected to the active device, and the contact structure electrically contacts the conductive layer.

18. The display panel of claim 16, wherein the conductive layer comprises an oxidation-resistant metal or a metal oxide.

19. The display panel of claim 12, wherein the first substrate further comprises one or more stacked pattern, the active device covers the stacked pattern, and the stacked pattern is disposed corresponding to the contact structure on the second substrate.

20. The display panel of claim 12, wherein the second substrate further comprises:
 a color filter array;
 a planarization layer, covering the color filter array, and the pixel electrode and the common electrode layer are on the planarization layer.

21. The display panel of claim 12, wherein the active device is a thin film transistor having a gate, a source and a drain, and the source and the drain comprise an oxidation-resistant metal or a metal oxide.

22. The display panel of claim 12, wherein the pixel electrode and the common electrode respectively have a branch-shaped pattern.

* * * * *